(12) United States Patent
Gong et al.

(10) Patent No.: US 12,625,413 B2
(45) Date of Patent: May 12, 2026

(54) APERTURE ADJUSTING APPARATUS, CAMERA MODULE, AND MOBILE TERMINAL

(71) Applicant: Shanghai Billu Electronics Co., Ltd., Shanghai (CN)

(72) Inventors: Gaofeng Gong, Shanghai (CN); Jianjun Xiang, Shanghai (CN)

(73) Assignee: Shanghai Billu Electronics Co., Ltd., Shanghai (CN)

( * ) Notice: Subject to any disclaimer, the term of this patent is extended or adjusted under 35 U.S.C. 154(b) by 262 days.

(21) Appl. No.: 18/658,772

(22) Filed: May 8, 2024

(65) Prior Publication Data

US 2024/0302714 A1    Sep. 12, 2024

(30) Foreign Application Priority Data

Mar. 9, 2023    (CN) .......................... 202320444224.6

(51) Int. Cl.
G03B 9/06 (2021.01)

(52) U.S. Cl.
CPC ...................................... G03B 9/06 (2013.01)

(58) Field of Classification Search
CPC ............................ G03B 9/00–06; G03B 30/00
See application file for complete search history.

(56) References Cited

U.S. PATENT DOCUMENTS

| | | | |
|---|---|---|---|
| 12,216,396 B2 * | 2/2025 | Chen ......................... | G03B 9/06 |
| 2002/0125843 A1 * | 9/2002 | Mizumaki .............. | H02K 26/00 |
| | | | 318/400.41 |
| 2016/0223780 A1 * | 8/2016 | Baek ...................... | H02K 37/12 |
| 2024/0061317 A1 * | 2/2024 | You .......................... | G03B 3/10 |
| 2025/0093613 A1 * | 3/2025 | Osada .................... | G03B 17/02 |

FOREIGN PATENT DOCUMENTS

CN        112859482 A  *  5/2021    .............. G03B 9/02

* cited by examiner

*Primary Examiner* — Leon W Rhodes, Jr.

(74) *Attorney, Agent, or Firm* — The Sun IP Law

(57) ABSTRACT

The disclosure provides an aperture adjusting apparatus, a camera module, and a mobile terminal. The aperture adjusting apparatus includes a cover plate assembly and a base assembly. The cover plate assembly covers the base assembly and forms an accommodating space with the base assembly. The aperture adjusting apparatus further includes a rotating support, a driving magnet, a driving coil, a first magnetic piece, and a blade assembly arranged in the accommodating space. The rotating support is rotatably arranged inside the accommodating space. The driving magnet is arranged on a circumferential side wall of the rotating support, and the driving magnet is formed by combining at least two single-pole magnetic strips or is directly formed by a multi-stage magnet that is integrally formed; the first magnetic piece is arranged on the cover plate assembly corresponding to the driving magnet.

20 Claims, 7 Drawing Sheets

APERTURE ADJUSTING APPARATUS, CAMERA MODULE, AND MOBILE TERMINAL

CROSS-REFERENCE TO RELATED APPLICATION

The disclosure claims the benefit of priority to Chinese Patent Application No. 202320444224.6, filed with the Chinese Patent Office on Mar. 9, 2023 and entitled "Aperture Adjusting Apparatus, Camera Module, and Mobile Terminal", which is incorporated in its entirety herein by reference.

TECHNICAL FIELD

The disclosure relates to the field of optical lens device, and in particular, to an aperture adjusting apparatus, a camera module, and a mobile terminal.

BACKGROUND OF THE INVENTION

At present, electronic devices such as smart phones and tablet computers have become indispensable electronic products in lives of people. With continuous development of electronic device industry, functions of the electronic devices are gradually becoming diversified and intelligent. A shooting function has become one of essential functions of the electronic devices. To achieve a photographing effect close to that of a single lens reflex camera on the electronic devices such as a mobile phone, a light input amount of a camera module needs to be adjusted according to a photographing environment. Configuring a variable aperture for the camera module is a means for adjusting the light input amount.

An existing magnetoelectric variable aperture includes a fixed part, a rotating part, a plurality of blades, and an upper cover. A plurality of groups of magnet coil driving assemblies symmetrically arranged in a circumferential direction act to generate an electromagnetic driving force, so that the rotating part rotates relative to the fixed part, and the rotating part pushes the plurality of blades to open and close. An existing structure has the problems: 1, the plurality of groups of magnet coil driving assemblies symmetrically arranged in the circumferential direction easily interfere with a Voice Coil Motor (VCM) and a Hall chip to affect a push force and driving precision; and 2, the upper cover is fixed to the fixed part, the upper cover matches the fixed part to prevent the blades from escaping. However, the upper cover easily deforms to extrude the blades due to the impact of the rotating part, which leads to the deformation and damage of the blades and affects the performance and service life of the variable aperture.

Therefore, there are problems that the variable aperture has poor driving precision and the upper cover is prone to damage in a related technology.

SUMMARY OF THE INVENTION

Some embodiments of the disclosure provides an aperture adjusting apparatus, a camera module, and a mobile terminal to solve problems that a variable aperture has poor driving precision and an upper cover is prone to damage in a related technology.

According to one embodiment of the disclosure, an aperture adjusting apparatus is provided, including a cover plate assembly and a base assembly. The cover plate assembly covers the base assembly and forms an accommodating space with the base assembly. The aperture adjusting device further includes a rotating support, a driving magnet, a driving coil, a first magnetic piece, and a blade assembly that are arranged inside the accommodating space. The rotating support is rotatably arranged inside the accommodating space. The driving magnet is arranged on a circumferential side wall of the rotating support, and the driving magnet is formed by combining at least two single-pole magnetic strips or is directly formed by a multi-stage magnet that is integrally formed. There is at least one driving coil, and all driving coils are arranged on a circumferential side wall of the base assembly corresponding to the driving magnet. The first magnetic piece is arranged on the cover plate assembly corresponding to the driving magnet. The blade assembly is arranged on a side, facing the cover plate assembly, of the base assembly, and the blade assembly is movably connected to the rotating support and rotates along with the rotating support.

In an embodiment, the aperture adjusting apparatus further includes a second magnetic piece. The second magnetic piece is arranged on the circumferential side wall of the base assembly corresponding to the driving magnet.

In an embodiment, magnetization directions of the single-pole magnetic strips are all arranged in a radial direction of the rotating support, and the magnetization directions of two adjacent single-pole magnetic strips are opposite.

In an embodiment, a quantity of the single-pole magnetic strips is N, a quantity of the driving coils is N−1, and two adjacent single-pole magnetic strips are correspondingly provided with one driving coil.

In an embodiment, the driving magnet includes at least three single-pole magnetic strips. Each of the single-pole magnetic strips includes a first single-pole magnetic strip and a second single-pole magnetic strip. The single-pole magnetic strips located at two ends of the plurality of single-pole magnetic strips are the first single-pole magnetic strips. The second single-pole magnetic strip is arranged between two adjacent first single-pole magnetic strips. A magnetization direction of the first single-pole magnetic strip is set in the radial direction of the rotating support. A magnetization direction of the second single-pole magnetic strip is parallel to a circumferential direction of the rotating support.

In an embodiment, a quantity of the driving coils is M, a quantity of the single-pole magnetic strips is 2M+1, and two adjacent first single-pole magnetic strips are correspondingly provided with one driving coil.

In an embodiment, a circumferential length of the driving magnet corresponding to the rotating support is less than half of a circumferential length of the rotating support.

In an embodiment, the cover plate assembly includes: a cover plate body and a blocking piece. The cover plate body covers the base assembly and abuts against a top surface of the rotating support. The blocking piece is arranged on a side, far away from the base assembly, of the cover plate body, and a reflectivity of the blocking piece is less than that of the cover plate body.

In an embodiment, a surface of the blocking piece has a coating film; and/or the cover plate body is made of plastics, and the cover plate body is internally embedded with a metal plate.

In an embodiment, a side, facing the base assembly, of the cover plate assembly has a plurality of fixed protrusions. The base assembly is provided with a plurality of fixed grooves corresponding to the plurality of fixed protrusions. Each fixed groove matches at least one fixed protrusion.

In an embodiment, a side, facing the rotating support, of the cover plate assembly has a plurality of abutting protrusions. A periphery of a side surface, facing the cover plate assembly, of the rotating support has an annular sunken area. The abutting protrusions abut against the sunken area.

In an embodiment, the base assembly further includes a base body and an electrical connection part. The cover plate assembly covers the base body and an anti-collision clearance is reserved between the rotating support and the base body. At least part of the electrical connection part is arranged around a circumferential side wall of the base body, and the driving coil is arranged on the electrical connection part and is electrically conductive to the electrical connection part.

In an embodiment, a bottom surface of base body has at least one anti-collision boss extending towards rotating support.

In an embodiment, the bottom surface of the base body has at least one limiting boss extending towards the rotating support. The rotating support is provided with at least one limiting groove corresponding to the limiting boss. At least part of the limiting boss is located inside the limiting groove. In a rotating direction of the rotating support, a length of the limiting groove is greater than that of the limiting boss.

In an embodiment, a height of the limiting boss is greater than that of the anti-collision boss.

In an embodiment, the electrical connection part includes: a Flexible Printed Circuit (FPC) board and a position detection part. At least part of the FPC board is arranged around the circumferential side wall of the base body, and the driving coil is arranged on the FPC board. The position detection part is arranged in an annular space of the driving coil and is electrically conductive to the FPC board.

In an embodiment, a strengthening plate is arranged at a position, at least corresponding to the driving coil, of the FPC board, and the strengthening plate is made of plastics.

In an embodiment, the aperture adjusting apparatus further includes at least two groups of rolling assemblies. The rotating support is in clearance fit with a circumferential inner side wall of the base body. The circumferential inner side wall of the base body is provided with two mounting grooves respectively corresponding to the two groups of rolling assemblies. At least part of the rolling assembly is arranged inside the mounting groove. At least other part of the rolling assembly protrudes from the mounting groove and is in rolling connection with a circumferential side wall of the rotating support.

In an embodiment, the rotating support is provided with two chutes respectively corresponding to the two groups of rolling assemblies. The rotating support is provided with a magnet mounting groove corresponding to the driving magnet. At least part of the driving magnet is located inside the magnet mounting groove. The two chutes are respectively formed in both ends of the magnet mounting groove. In a rotating direction of the rotating support, a length of the chute is greater than or equal to a rotating distance of the rotating support.

In an embodiment, the rolling assembly includes: at least three rolling balls or a roller. The three rolling balls are arranged in a Z-axial direction; or an axial direction of the roller is parallel to the Z-axial direction.

According to another embodiment of the disclosure, a camera module is provided, including the aperture adjusting apparatus described above.

According to another embodiment of the disclosure, a mobile terminal is provided, including the camera module described above.

By applying a technical solution of the disclosure, the aperture adjusting apparatus in the disclosure includes a cover plate assembly and a base assembly. The cover plate assembly covers the base assembly and forms an accommodating space with base assembly. The aperture adjusting apparatus further includes a rotating support, a driving magnet, a driving coil, a first magnetic piece, and a blade assembly arranged inside the accommodating space. The rotating support is rotatably arranged inside the accommodating space. The driving magnet is arranged on a circumferential side wall of the rotating support, and the driving magnet is formed by combining at least two single-pole magnetic strips or is directly formed by a multi-stage magnet that is integrally formed. There is at least one driving coil, and all driving coils are arranged on a circumferential side wall of the base assembly corresponding to the driving magnet. The first magnetic piece is arranged on the cover plate assembly corresponding to the driving magnet. The blade assembly is arranged on a side, facing the cover plate assembly, of the base assembly, and the blade assembly is movably connected to the rotating support and rotates along with the rotating support.

When the aperture adjusting apparatus in the disclosure is used, the driving magnet is arranged on the rotating support and the driving coil is arranged on the base assembly, the rotating support can rotate relative to the base assembly under the interaction between the driving magnet and the driving coil, so that the rotating support drives the blade assembly to rotate relative to the base assembly to achieve adjustment of a size of an aperture. Moreover, the aperture adjusting apparatus in the disclosure has only one driving magnet, so magnetic interference is reduced compared with a plurality of groups of magnets that are symmetrically arranged traditionally. Meanwhile, the driving magnet is formed by combining at least two single-pole magnetic strips or is directly formed by a multi-stage magnet that is integrally formed, so the driving magnet in the disclosure can ensure a driving force on the rotating support. The aperture adjusting apparatus in the disclosure also has a first magnetic piece, so that the rotating support can be ensured to abut against the cover plate assembly through mutual induction between the first magnetic piece and the driving magnet, and the impact between the blade assembly and the cover plate assembly is effectively reduced. Therefore, by the aperture adjusting apparatus in the disclosure, the problems that the variable aperture has poor driving precision and the upper cover is prone to damage in the related technology are effectively solved.

BRIEF DESCRIPTION OF THE DRAWINGS

The drawings, which constitute a part of the disclosure, are used to provide a further understanding of the disclosure, and the exemplary embodiments of the disclosure and the description thereof are used to explain the disclosure, but do not constitute improper limitations to the disclosure. In the drawings.

Figure 1:
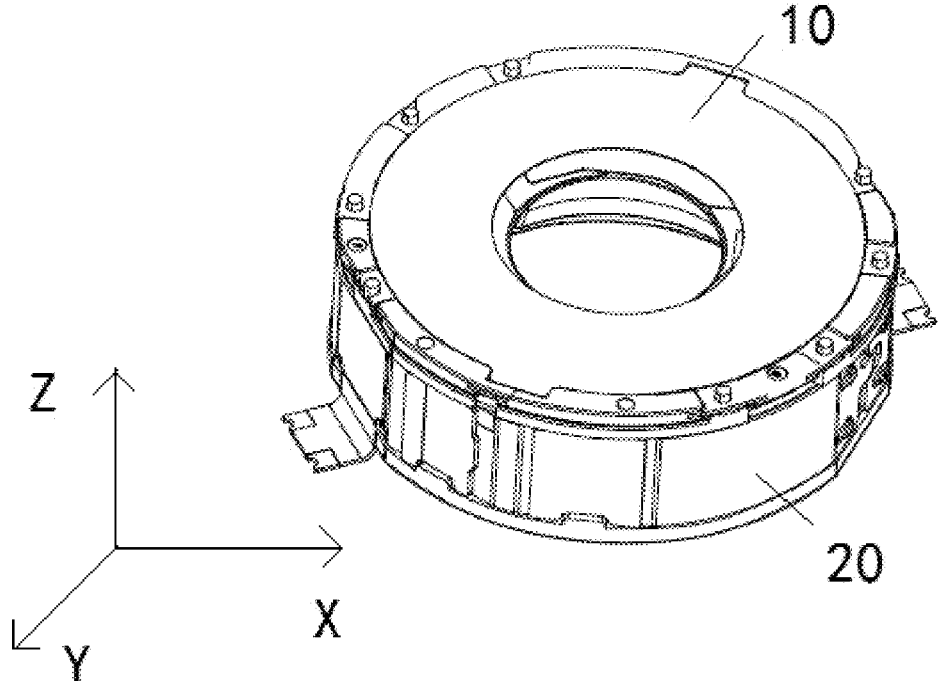
FIG. 1 illustrates a schematic structural diagram of an aperture adjusting apparatus according to a specific embodiment of the disclosure.
Figure 2:
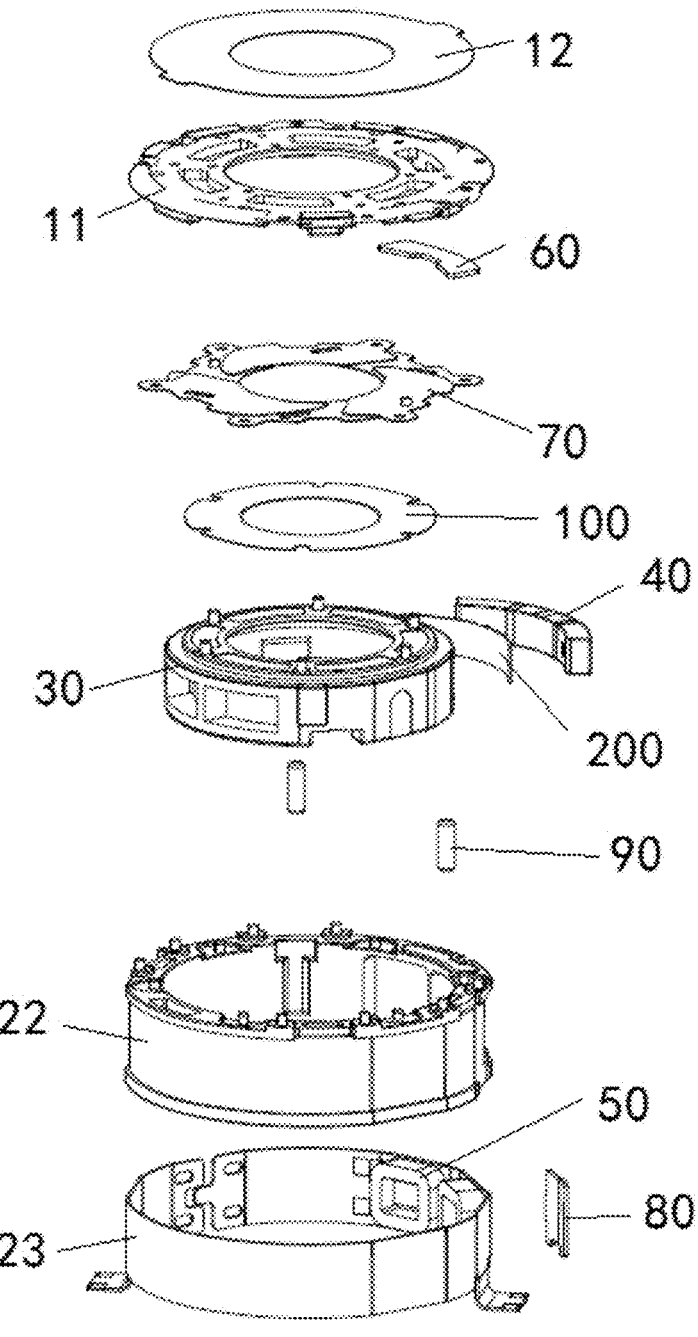
FIG. 2 illustrates an exploded view of the aperture adjusting apparatus in FIG. 1.
Figure 3:
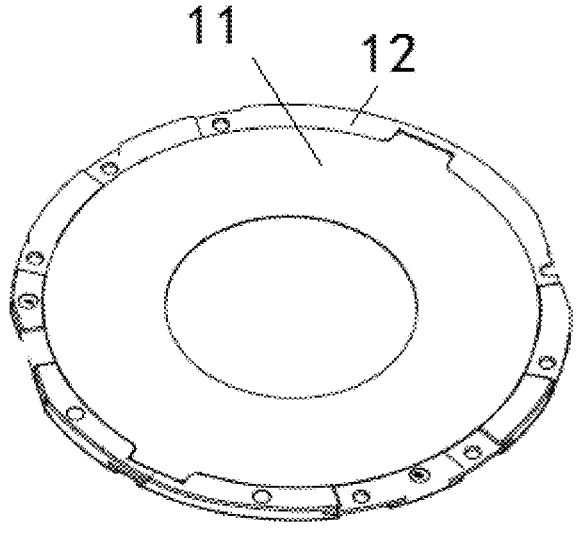
FIG. 3 illustrates a schematic structural diagram of a cover plate assembly of the aperture adjusting apparatus in FIG. 1.
Figure 4:
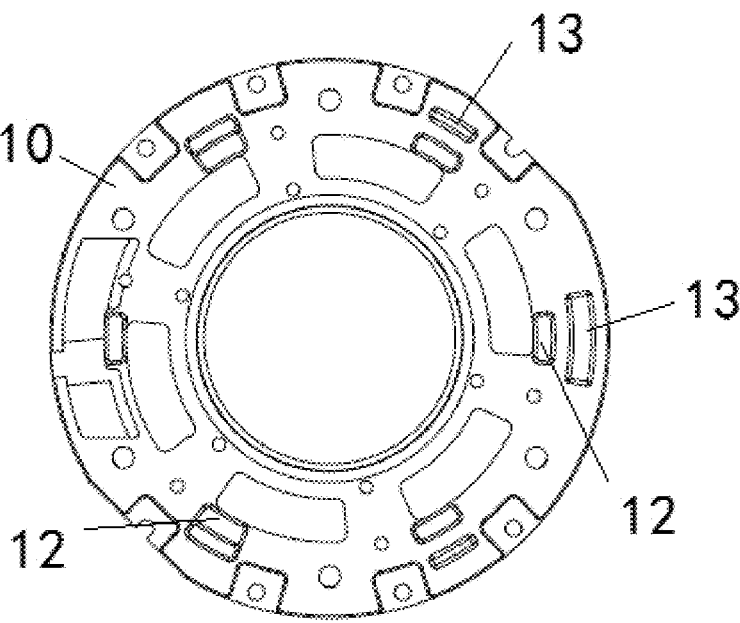
FIG. 4 illustrates a schematic structural diagram of the cover plate assembly of the aperture adjusting apparatus in FIG. 1 from another perspective.
Figure 5:
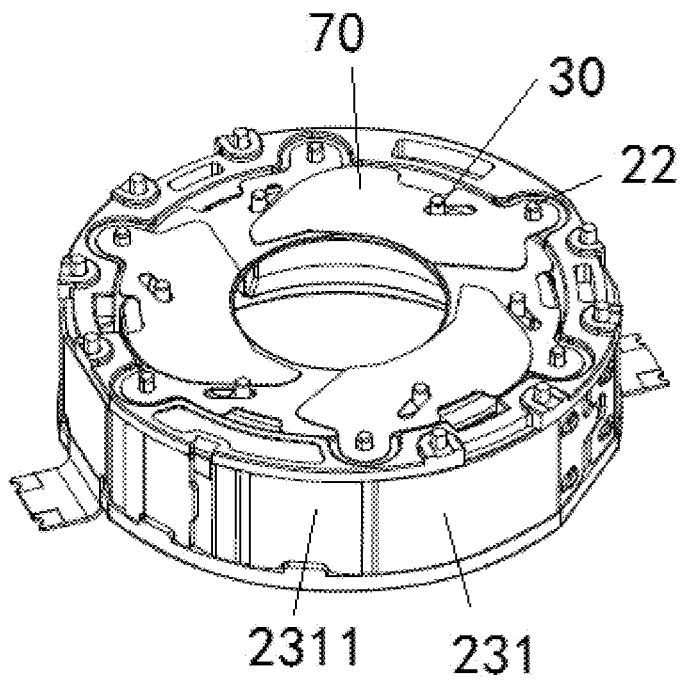
FIG. 5 illustrates a schematic diagram of an internal structure of the aperture adjusting apparatus in FIG. 1 after the cover plate assembly is removed.
Figure 6:
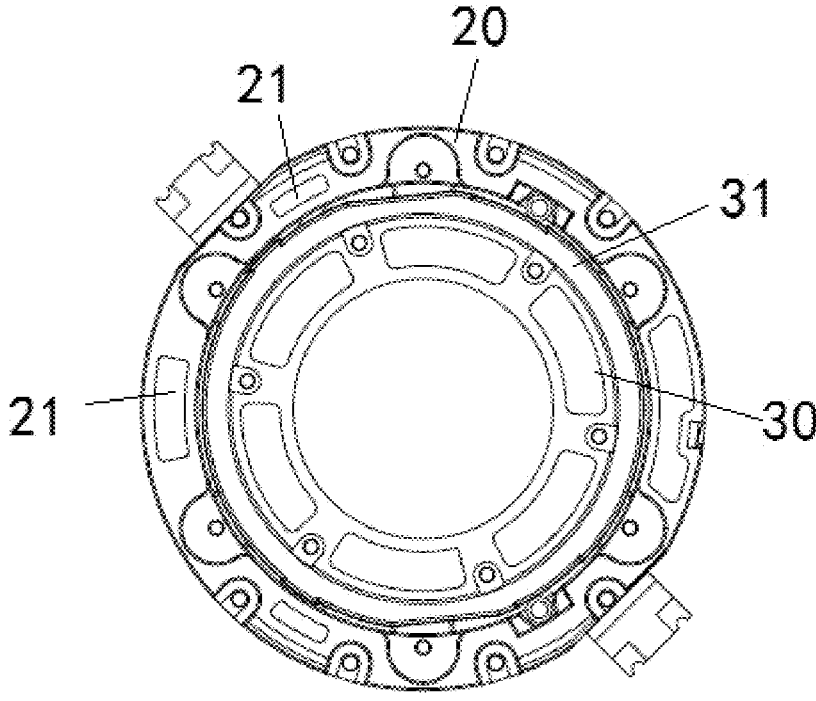
FIG. 6 illustrates a schematic diagram of a positional relationship between a base assembly and a rotating support of the aperture adjusting apparatus in FIG. 1.
Figure 7:
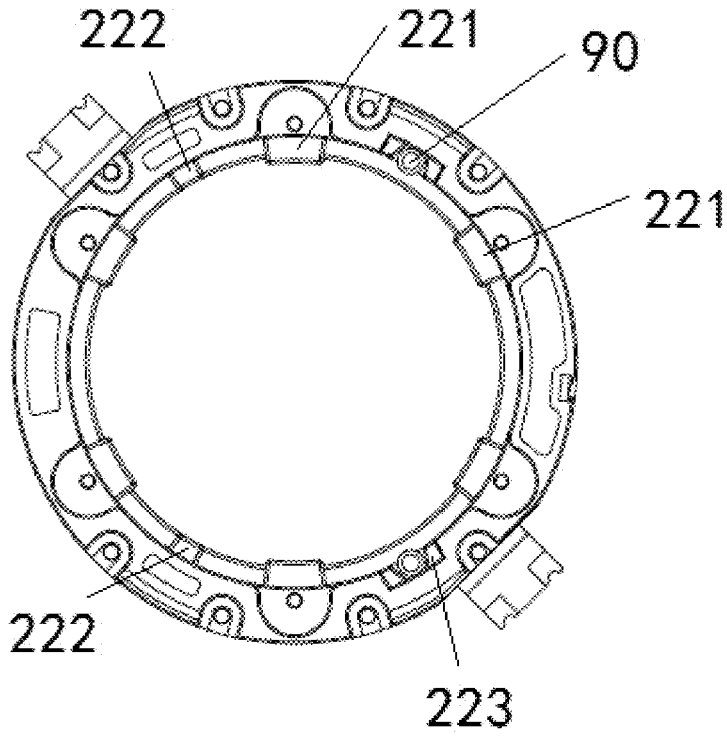
FIG. 7 illustrates a schematic diagram of a positional relationship among an anti-collision boss, a limiting boss, and a mounting groove of the base assembly of the aperture adjusting apparatus in FIG. 1.
Figure 8:
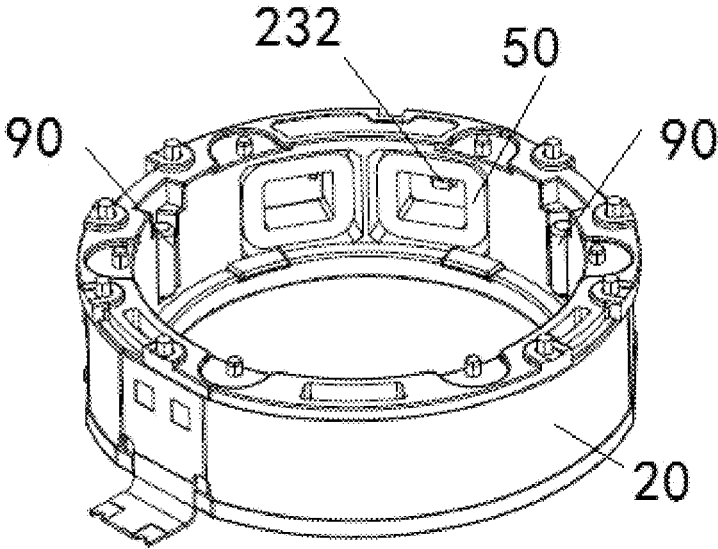
FIG. 8 illustrates a schematic diagram of a positional relationship among a driving coil, a rolling assembly, and the base assembly of the aperture adjusting apparatus in FIG. 1.
Figure 9:
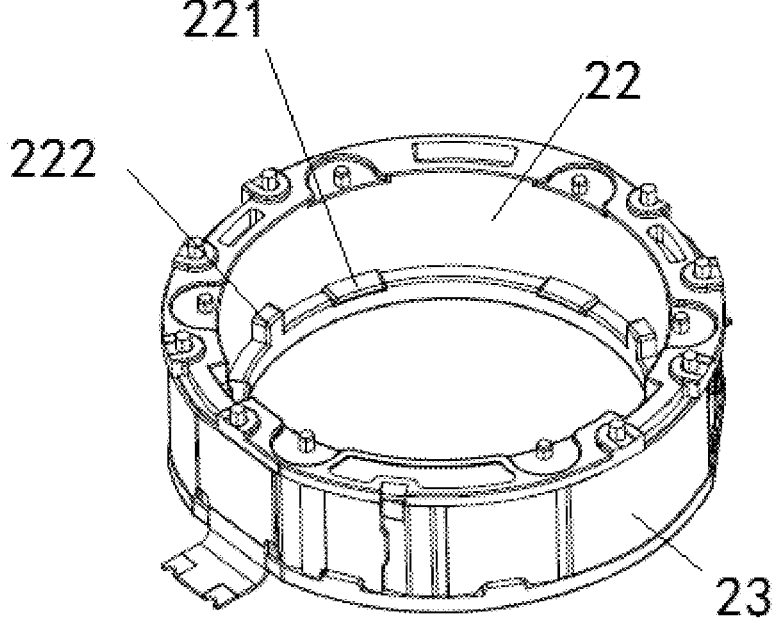
FIG. 9 illustrates a schematic structural diagram of a base body of the aperture adjusting apparatus in FIG. 1.
Figure 10:
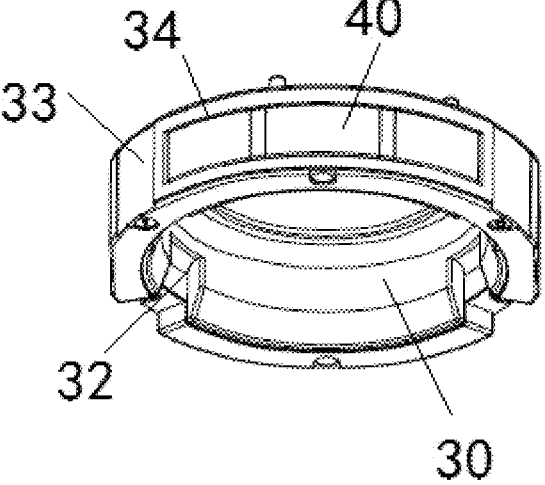
FIG. 10 illustrates a schematic structural diagram of the rotating support of the aperture adjusting apparatus in FIG. 1.

The above drawings include the following reference signs:

10, cover plate assembly; 11, cover plate body; 12, blocking piece; 13, fixed protrusion; 14, abutting protrusion; 20, base assembly; 21, fixed groove; 22, base body; 221, anti-collision boss; 222, limiting boss; 223, mounting groove; 23, electrical connection part; 231, FPC board; 2311, strengthening plate; 232, position detection part; 30, rotating support; 31, sunken area; 32, limiting groove; 33, chute; 34, magnet mounting groove; 40, driving magnet; 41, single-pole magnetic strip; 411, first single-pole magnetic strip; 412, second single-pole magnetic strip; 50, driving coil; 60, first magnetic piece; 70, blade assembly; 80, second magnetic piece; 90, rolling assembly; 100, gasket; and 200, magnetic baffle.

DETAILED DESCRIPTION OF THE INVENTION

It is to be noted that embodiments in the disclosure and features in embodiments may be combined with each other without a conflict. The disclosure is described in detail below with reference to the accompanying drawings and in combination with the embodiments.

It is to be noted that, unless otherwise specified, all technical and scientific terms used in the disclosure have the same meaning commonly understood by those skilled in the art.

In the disclosure, unless otherwise specified, the directional words used such as "up, down, top, and bottom" are usually directed at directions shown in the drawings, or directed at parts in vertical, vertical, or gravity directions. Similarly, for the convenience of understanding and description, "inside and outside" refer to the inside and outside relative to contours of various parts, but the directional words described above are not used for limiting the disclosure.

To solve the problems that a variable aperture has poor driving precision and an upper cover is prone to damage in a related technology, the disclosure provides an aperture adjusting apparatus, a camera module, and a terminal device.

Moreover, the camera module in the disclosure has the aperture adjusting apparatus described below. The mobile terminal may be a mobile phone, a tablet computer, a notebook computer, and the like having the camera module in the disclosure.

As shown in FIG. 1 to FIG. 10, the aperture adjusting apparatus in the disclosure includes a cover plate assembly 10 and a base assembly 20. The cover plate assembly 10 covers the base assembly 20 and forms an accommodating space with base assembly 20. The aperture adjusting apparatus further includes a rotating support 30, a driving magnet 40, a driving coil 50, a first magnetic piece 60, and a blade assembly 70 arranged inside the accommodating space. The rotating support 30 is rotatably arranged inside the accommodating space. The driving magnet 40 is arranged on a circumferential side wall of the rotating support 30, and the driving magnet 40 is formed by combining at least two single-pole magnetic strips or is directly formed by a multi-stage magnet that is integrally formed. There is at least one driving coil 50, and all driving coils 50 are arranged on a circumferential side wall of the base assembly 20 corresponding to the driving magnet 40. The first magnetic piece 60 is arranged on the cover plate assembly 10 corresponding to the driving magnet 40. The blade assembly 70 is arranged on a side, facing the cover plate assembly 10, of the base assembly 20, and the blade assembly 70 is movably connected to the rotating support 30 and rotates along with the rotating support 30.

When the aperture adjusting apparatus in the disclosure is used, the driving magnet 40 is arranged on the rotating support 30 and the driving coil 50 is arranged on the base assembly 20, the rotating support 30 can rotate relative to the base assembly 20 under the interaction between the driving magnet 40 and the driving coil 50, so that the rotating support 30 drives the blade assembly 70 to rotate relative to the base assembly 20 to achieve adjustment of a size of an aperture. Moreover, the aperture adjusting apparatus in the disclosure has only one driving magnet 40, so magnetic interference is reduced compared with a plurality of groups of magnets 40 that are symmetrically arranged traditionally. Meanwhile, the driving magnet 40 is formed by combining at least two single-pole magnetic strips or the driving magnet 40 is directly formed by a multi-stage magnet that is integrally formed, so the driving magnet 40 in the disclosure can ensure a driving force on the rotating support 30. The aperture adjusting apparatus in the disclosure also has a first magnetic piece 60, so that the rotating support 30 can be ensured to abut against the cover plate assembly 10 through mutual induction between the first magnetic piece 60 and the driving magnet 40, and the impact between the blade assembly 70 and the cover plate assembly 10 is effectively reduced. Therefore, by the aperture adjusting apparatus in the disclosure, the problems that the variable aperture has poor driving precision and the upper cover is prone to damage in the related technology are effectively solved.

It is to be noted that two adjacent single-pole magnetic strips of the plurality of single-pole magnetic strips of the driving magnet 40 in the disclosure are arranged close to each other, and surfaces on the sides, close to each other, of the two adjacent single-pole magnetic strips overlap each other. Meanwhile, the driving magnet 40 in the disclosure may be arranged on a surface of a circumferential outer side wall of the rotating support 30, or may also be embedded on the circumferential outer side wall of the rotating support 30.

Figure 11:
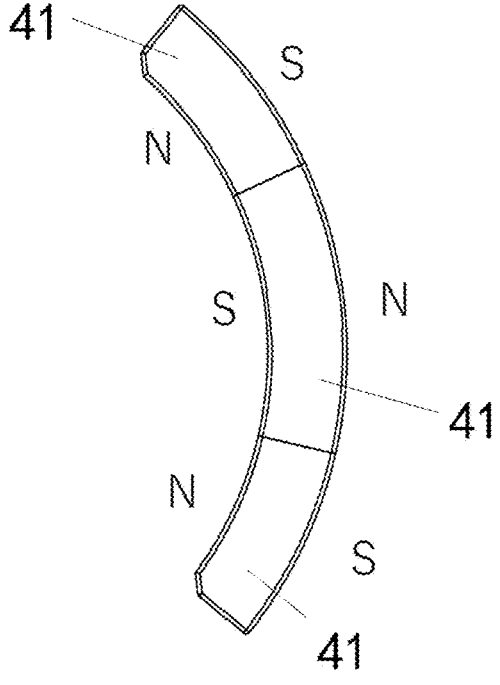
FIG. 11 illustrates a schematic structural diagram of a driving magnet of the aperture adjusting apparatus in a specific embodiment of the disclosure.

In a specific embodiment of the disclosure, magnetization directions of the single-pole magnetic strips are all arranged in a radial direction of the rotating support 30, and the magnetization directions of the two adjacent single-pole magnetic strips 41 are opposite. Moreover, a quantity of the single-pole magnetic strips 41 is N, a quantity of the driving coils 50 is N-1, and two adjacent single-pole magnetic strips are correspondingly provided with one driving coil 50. That is to say, in this embodiment, as shown in FIG. 11, when the quantity of the single-pole magnetic strips is 3, the quantity of the driving coils 50 is 2, and N and S in the figure respectively represent magnetic poles of the magnet. When the quantity of the single-pole magnetic strips is 4, the quantity of the driving coils 50 is 3, and the quantities of the driving coils 50 corresponding to other quantities of the single-pole magnetic strips are obtained by analogy.

Figure 12:
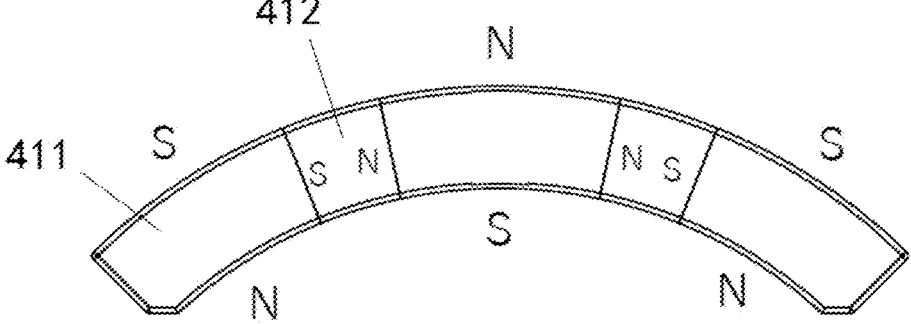
FIG. 12 illustrates a schematic structural diagram of the driving magnet of the aperture adjusting apparatus in another specific embodiment of the disclosure.

In another specific embodiment of the disclosure, the driving magnet 40 includes at least three single-pole magnetic strips. Each of the single-pole magnetic strips includes a first single-pole magnetic strip 411 and a second single-pole magnetic strip 412. The single-pole magnetic strips located at two ends of the plurality of single-pole magnetic strips are the first single-pole magnetic strips 411. The second single-pole magnetic strip 412 is arranged between two adjacent first single-pole magnetic strips 411. A magnetization direction of the first single-pole magnetic strip 411 is set in the radial direction of the rotating support 30. A magnetization direction of the second single-pole magnetic strip 412 is parallel to a circumferential direction of the rotating support 30. In an embodiment, a quantity of the driving coils 50 is M, a quantity of the single-pole magnetic strips is 2M+1, and two adjacent first single-pole magnetic strips 411 are correspondingly provided with one driving coil 50. That is to say, in this embodiment, when the quantity of the single-pole in magnetic strips 41 is 3, the quantity of the driving coils 50 is 1. As shown in FIG. 12, when the quantity of the single-pole magnetic strips is 5, a quantity of the first single-pole magnetic strips 411 is 3, a quantity of the second single-pole magnetic strips 412 is 2, the quantity of the driving coils 50 is 2, and N and S in the figure respectively represent magnetic poles of the magnet. Moreover, the driving magnets 40 in this embodiment are in a Halbeck array.

Certainly, in the two different embodiments described above, the driving magnet 40 may also be a multi-stage magnet formed in a form of magnetizing in a plurality of stages. Moreover, the driving magnet 40 in the disclosure may also be formed according to other production process, as long as meeting use requirements of the driving magnet 40 in the disclosure.

In an embodiment, a circumferential length of the driving magnet 40 corresponding to the rotating support 30 is less than half of a circumferential length of the rotating support 30. Through such arrangement, magnetic interference generated by the driving magnet 40 on other structures in a camera module (for example, an Automatic Focus (AF) motor) can be effectively reduced.

Specifically, the cover plate assembly 10 includes a cover plate body 11 and a blocking piece 12. The cover plate body 11 covers the base assembly 20 and abuts against a top surface of the rotating support 30. The blocking piece 12 is arranged on a side, far away from the base assembly 20, of the cover plate body 11, and a reflectivity of the blocking piece 12 is less than that of the cover plate body 11. In an embodiment, a surface of the blocking piece 12 has a coating film; and the cover plate body 11 is made of plastics, and the cover plate body 11 is internally embedded with a metal plate. In a specific embodiment of the disclosure, the blocking piece 12 is coated by using a Polyimide (PI) material to form a blocking piece 12 with a low reflectivity, so as to reduce an influence of reflected light on a lens. Moreover, compared with a manner that a conventional integrated upper cover needs to be integrally coated, an arrangement manner in the disclosure can effectively reduce the production cost. The cover plate body 11 is internally embedded with the metal plate, so that the use strength of the cover plate body 11 can be effectively improved. In an embodiment, the cover plate body 11 is internally embedded with a non-magnetic stainless steel piece.

In an embodiment, a side, facing the base assembly 20, of the cover plate assembly 10 has a plurality of fixed protrusions 13. The base assembly 20 is provided with a plurality of fixed grooves 21 corresponding to the plurality of fixed protrusions 13. Each fixed groove 21 matches at least one fixed protrusion 13. Through such arrangement, the connection stability between the cover plate assembly 10 and the base assembly 20 can be effectively ensured. Moreover, in the disclosure, glue may be filled into the fixed grooves 21, so as to further ensure the connection stability between the cover plate assembly 10 and the base assembly 20.

In an embodiment, a side, facing the rotating support 30, of the cover plate assembly 10 has a plurality of abutting protrusions 14. A periphery of a side surface, facing the cover plate assembly 10, of the rotating support 30 has an annular sunken area 31. The abutting protrusions 14 abut against the sunken area 31. Through such arrangement, the abutting protrusions 14 may abut against the periphery of the rotating support 30 to provide sufficient space for movement of the blade assembly 70, thereby effectively ensuring use performance of the aperture driving apparatus.

Specifically, the base assembly 20 further includes a base body 22 and an electrical connection part 23. The cover plate assembly 10 covers the base body 22 and an anti-collision clearance is reserved between the rotating support 30 and the base body 22. At least part of the electrical connection part 23 is arranged around a circumferential side wall of the base body 22, and the driving coil 50 is arranged on the electrical connection part 23 and is electrically conductive to the electrical connection part 23.

In an embodiment, a bottom surface of base body 22 has at least one anti-collision boss 221 extending towards rotating support 30.

Specifically, the bottom surface of the base body 22 has at least one limiting boss 222 extending towards the rotating support 30. The rotating support 30 is provided with at least one limiting groove 32 corresponding to the limiting boss 222. At least part of the limiting boss 222 is located inside the limiting groove 32. In a rotating direction of the rotating support 30, a length of the limiting groove 32 is greater than that of the limiting boss 222. Through such arrangement, the rotating distance of the rotating support 30 is limited through mutual cooperation of the limiting boss 222 and the limiting groove 32, so as to ensure normal operation of the aperture adjusting apparatus. That is to say, in the disclosure, when the rotating support 30 rotates under the interaction between the driving magnet 40 and the driving coil 50, there is relative movement between the limiting groove 32 and the limiting boss 222, and rotation of the rotating support 30 can be limited through the limiting groove 32 and the limiting boss 222 when the limiting boss 222 is in contact with an end part of the limiting groove 32. Moreover, in a specific embodiment of the disclosure, there are a plurality of limiting bosses 222 and a plurality of limiting grooves 32, and each limiting groove 32 matches one limiting boss 222.

In an embodiment, a height of the limiting boss 222 is greater than that of the anti-collision boss 221.

Specifically, the electrical connection part 23 includes an FPC board 231 and a position detection part 232. At least part of the FPC board 231 is arranged around the circumferential side wall of the base body 22, and the driving coil 50 is arranged on the FPC board 231. The position detection part 232 is arranged in an annular space of the driving coil 50 and is electrically conductive to the FPC board 231. In a specific embodiment of the disclosure, the position detection part 232 includes a Hall chip and a capacitor; and the closer the distance between the Hall chip and the capacitor, the better the effect.

In an embodiment, a strengthening plate 2311 is arranged at a position, at least corresponding to the driving coil 50, of the FPC board 231, and the strengthening plate 2311 is made of plastics. The strengthening plate 2311 is arranged, which can enhance the use strength of the FPC board 231, and avoid the interference generated by a metal material on the Hall chip, so the strengthening plate 2311 is made of a plastic material.

Specifically, the aperture adjusting apparatus further includes at least two groups of rolling assemblies 90. The rotating support 30 is in clearance fit with a circumferential inner side wall of the base body 22. The circumferential inner side wall of the base body 22 is provided with two mounting grooves 223 respectively corresponding to the two groups of rolling assemblies 90. At least part of the rolling assembly 90 is arranged inside the mounting groove 223. At least other part of the rolling assembly 90 protrudes from the mounting groove 223 and is in rolling connection with a circumferential side wall of the rotating support 30. Moreover, the rotating support 30 is provided with two chutes 33 respectively corresponding to the two groups of rolling assemblies 90. The rotating support 30 is provided with a magnet mounting groove 34 corresponding to the driving magnet 40. At least part of the driving magnet 40 is located inside the magnet mounting groove 34. The two chutes 33 are respectively formed in both ends of the magnet mounting groove 34. In a rotating direction of the rotating support 30, a length of the chute 33 is greater than or equal to a rotating distance of the rotating support 30. In the disclosure, the rolling assembly 90 is arranged, which can effectively reduce a friction force between the rotating support 30 and the base body 22 when the rotating support 30 rotates. Moreover, when the rolling assembly 90 acts, the rolling assembly 90 may rotate relative to the base body 22, and there is sliding between the rolling assembly 90 and the rotating support 30.

In an embodiment, a magnetic baffle 200 is also arranged inside the magnet mounting groove 34.

In a specific embodiment of the disclosure, the rolling assembly 90 includes: at least three rolling balls. The three rolling balls are arranged in a Z-axial direction. In another specific embodiment of the disclosure, the rolling assembly 90 includes a roller. An axial direction of the roller is parallel to the Z-axial direction.

In an embodiment, the aperture adjusting apparatus further includes a second magnetic piece 80. The second magnetic piece 80 is arranged on the circumferential side wall of the base assembly 20 corresponding to the driving magnet 40. In the disclosure, the second magnetic piece 80 is arranged, so that the circumferential side wall of the rotating support 30 can get close to an inner side wall of the base body 22, so as to ensure that the rotating support 30 abuts against the rolling balls or the roller. That is to say, in the disclosure, the second magnetic piece 80 may be arranged on the sides, close to each other, of the two groups of rolling assemblies 90, or the second magnetic piece 80 is arranged on a major arc formed by the two groups of rolling assemblies 90. Meanwhile, in the disclosure, the first magnetic piece 60 and the second magnetic piece 80 respectively match the driving magnet 40, which can effectively ensure the stability of the rotating support 30 during rotating and prevent the rotating support 30 from tilting.

Moreover, in the disclosure, the second magnetic piece 80 may be made of a composite material, and at least part of the second magnetic piece 80 has magnetism, so that the second magnetic piece 80 can generate an attraction force with the driving magnet 40.

In an embodiment, an included angle formed by connecting lines between the two groups of rolling assemblies 90 and the rotating support 30 is less than 180°.

In an embodiment, the aperture adjusting apparatus in the disclosure further includes a gasket 100, and the gasket 100 is arranged between the blade assembly and the rotating support.

It is to be noted that, in the disclosure, the rotating support 30 rotates in an XY plane under the interaction between the driving magnet 40 and the driving coil 50. Moreover, the top surface and the bottom surface described above generally refer to the top surface and the bottom surface in the Z-axial direction.

From the above description, it can be seen that the above embodiments of the disclosure achieve the following technical effects.

1. The problems that a variable aperture has poor driving precision and an upper cover is prone to damage in a related technology are effectively solved.

2. The structure is simple, and the performance is stable.

It is apparent that the embodiments described above are merely part rather than all of the embodiments of the disclosure. On the basis of the embodiments of the disclosure, all other embodiments obtained by those of ordinary skill in the art without creative work fall within the scope of protection of the disclosure.

It is to be noted that terms used herein are only used for describing specific embodiments, but are not intended to limit exemplary embodiments of the disclosure. As used herein, unless otherwise explicitly stated in the context, singular forms are intended to include plural forms. In addition, it is also to be understood that when terms "contain" and/or "include" are used in the description, they indicate that features, steps, operations, devices, assemblies and/or combinations thereof exist.

It is to be noted that specification and claims of the disclosure and the terms "first", "second" and the like in the drawings are used for distinguishing similar objects, and do not used for describing a specific sequence or a precedence order. It is to be understood that data used in such a way may be exchanged under appropriate conditions, so that the embodiments of the disclosure described here can be implemented in a sequence other than sequences graphically shown or described here.

The above are only preferred embodiments of the disclosure and are not intended to limit the disclosure. For those skilled in the art, the disclosure may have various modifications and changes. Any modifications, equivalent replacements, improvements and the like made within the spirit and principle of the disclosure fall within the scope of protection of the disclosure.

The invention claimed is:

1. An aperture adjusting apparatus, comprising a cover plate assembly and a base assembly, wherein the cover plate assembly covers the base assembly and forms an accommodating space with the base assembly; the aperture adjusting apparatus further comprises the following parts arranged in the accommodating space:

a rotating support, the rotating support being rotatably arranged inside the accommodating space;

a driving magnet, the driving magnet being arranged on a circumferential side wall of the rotating support, and the driving magnet being formed by combining at least two single-pole magnetic strips or being directly formed by a multi-stage magnet that is integrally formed;

a driving coil, there being at least one driving coil, and all driving coils being arranged on a circumferential side wall of the base assembly corresponding to the driving magnet;

a first magnetic piece, the first magnetic piece being arranged on the cover plate assembly corresponding to the driving magnet; and a blade assembly, the blade assembly being arranged on a side, facing the cover plate assembly, of the base assembly, and blade assembly being movably connected to the rotating support and rotating along with the rotating support.

2. The aperture adjusting apparatus according to claim 1, wherein the aperture adjusting apparatus further comprises a second magnetic piece, wherein the second magnetic piece is arranged on the circumferential side wall of the base assembly corresponding to the driving magnet.

3. The aperture adjusting apparatus according to claim 1, wherein magnetization directions of the single-pole magnetic strips are all arranged in a radial direction of the rotating support, and the magnetization directions of two adjacent single-pole magnetic strips are opposite.

4. The aperture adjusting apparatus according to claim 3, wherein a quantity of the single-pole magnetic strips is N, a quantity of the driving coils is N−1, and two adjacent single-pole magnetic strips are correspondingly provided with one driving coil.

5. The aperture adjusting apparatus according to claim 1, wherein the driving magnet comprises at least three single-pole magnetic strips; each of the single-pole magnetic strips comprises a first single-pole magnetic strip and a second single-pole magnetic strip; the single-pole magnetic strips located at two ends of the plurality of single-pole magnetic strips are the first single-pole magnetic strips; the second single-pole magnetic strip is arranged between two adjacent first single-pole magnetic strips; a magnetization direction of the first single-pole magnetic strip is set in the radial direction of the rotating support; and a magnetization direction of the second single-pole magnetic strip is set parallel to a circumferential direction of the rotating support.

6. The aperture adjusting apparatus according to claim 5, wherein a quantity of the driving coils is M, a quantity of the single-pole magnetic strips is 2M+1, and two adjacent first single-pole magnetic strips are correspondingly provided with one driving coil.

7. The aperture adjusting apparatus according to claim 1, wherein a circumferential length of the driving magnet corresponding to the rotating support is less than half of a circumferential length of the rotating support.

8. The aperture adjusting apparatus according to claim 1, wherein the cover plate assembly comprises:

a cover plate body, wherein the cover plate body covers the base assembly and abuts against a top surface of the rotating support; and a blocking piece, wherein the blocking piece is arranged on a side, far away from the base assembly, of the cover plate body, and a reflectivity of the blocking piece is less than that of the cover plate body.

9. The aperture adjusting apparatus according to claim 8, wherein a surface of the blocking piece has a coating film; and/or the cover plate body is made of plastics, and the cover plate body is internally embedded with a metal plate.

10. The aperture adjusting apparatus according to claim 1, wherein a side, facing the base assembly, of the cover plate assembly has a plurality of fixed protrusions; the base assembly is provided with a plurality of fixed grooves corresponding to the plurality of fixed protrusions; and each fixed groove matches at least one fixed protrusion.

11. The aperture adjusting apparatus according to claim 1, wherein a side, facing the rotating support, of the cover plate assembly has a plurality of abutting protrusions; a periphery of a side surface, facing the cover plate assembly, of the rotating support has an annular sunken area; and the abutting protrusions abut against the sunken area.

12. The aperture adjusting apparatus according to claim 1, wherein the base assembly comprises:

a base body, wherein the cover plate assembly covers the base body and an anti-collision clearance is reserved between the rotating support and the base body; and an electrical connection part, wherein at least part of the electrical connection part is arranged around a circumferential side wall of the base body, and the driving coil is arranged on the electrical connection part and is electrically conductive to the electrical connection part.

13. The aperture adjusting apparatus according to claim 12, wherein a bottom surface of the base body has at least one anti-collision boss extending towards the rotating support.

14. The aperture adjusting apparatus according to claim 13, wherein the bottom surface of the base body has at least one limiting boss extending towards the rotating support; the rotating support is provided with at least one limiting groove corresponding to the limiting boss; at least part of the limiting boss is located inside the limiting groove; and in a rotating direction of the rotating support, a length of the limiting groove is greater than that of the limiting boss, a height of the limiting boss is greater than that of the anti-collision boss.

15. The aperture adjusting apparatus according to claim 12, wherein the electrical connection part comprises:

a Flexible Printed Circuit (FPC) board, wherein at least part of the FPC board is arranged around the circumferential side wall of the base body, and the driving coil is arranged on the FPC board; and a position detection part, wherein the position detection part is arranged in an annular space of the driving coil and is electrically conductive to the FPC board, a strengthening plate is arranged at a position, at least corresponding to the driving coil, of the FPC board, and the strengthening plate is made of plastics.

16. The aperture adjusting apparatus according to claim 12, wherein the aperture adjusting apparatus further comprises at least two groups of rolling assemblies, wherein the rotating support is in clearance fit with a circumferential inner side wall of the base body; the circumferential inner side wall of the base body is provided with two mounting grooves respectively corresponding to the two groups of rolling assemblies; at least part of the rolling assembly is arranged inside the mounting groove; and at least other part of the rolling assembly protrudes from the mounting groove and is in rolling connection with a circumferential side wall of the rotating support.

17. The aperture adjusting apparatus according to claim 16, wherein the rotating support is provided with two chutes respectively corresponding to the two groups of rolling assemblies; the rotating support is provided with a magnet mounting groove corresponding to the driving magnet; at least part of the driving magnet is located inside the magnet mounting groove; the two chutes are respectively formed in both ends of the magnet mounting groove; and in a rotating direction of the rotating support, a length of the chute is greater than or equal to a rotating distance of the rotating support.

18. The aperture adjusting apparatus according to claim 16, wherein the rolling assembly comprises:

at least three rolling balls, wherein the three rolling balls are arranged in a Z-axial direction; or a roller, wherein an axial direction of the roller is parallel to the Z-axial direction.

19. A camera module, comprising the aperture adjusting apparatus according to claim 1.

20. A mobile terminal, comprising the camera module according to claim 19.

* * * * *